May 1, 1934.    G. PIERSON    1,957,108
BEET HARVESTER
Filed April 18, 1931    3 Sheets-Sheet 1

Inventor
George Pierson
By Howard Pischer
Attorney

May 1, 1934.　　　　　G. PIERSON　　　　　1,957,108
BEET HARVESTER
Filed April 18, 1931　　　3 Sheets-Sheet 2
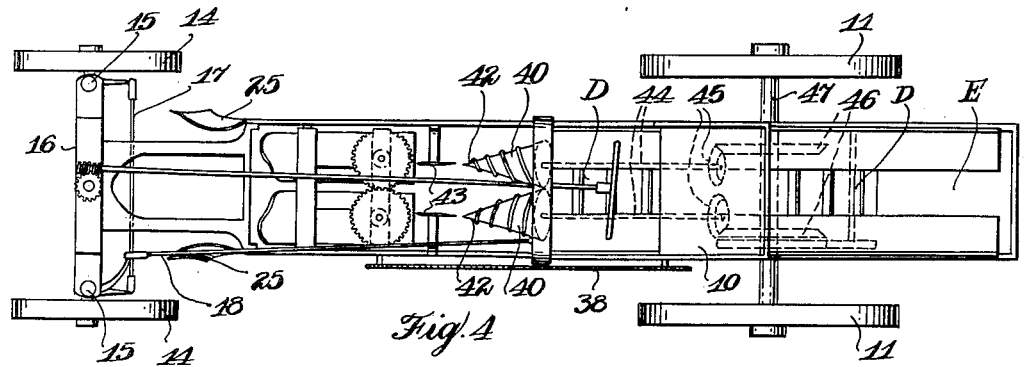
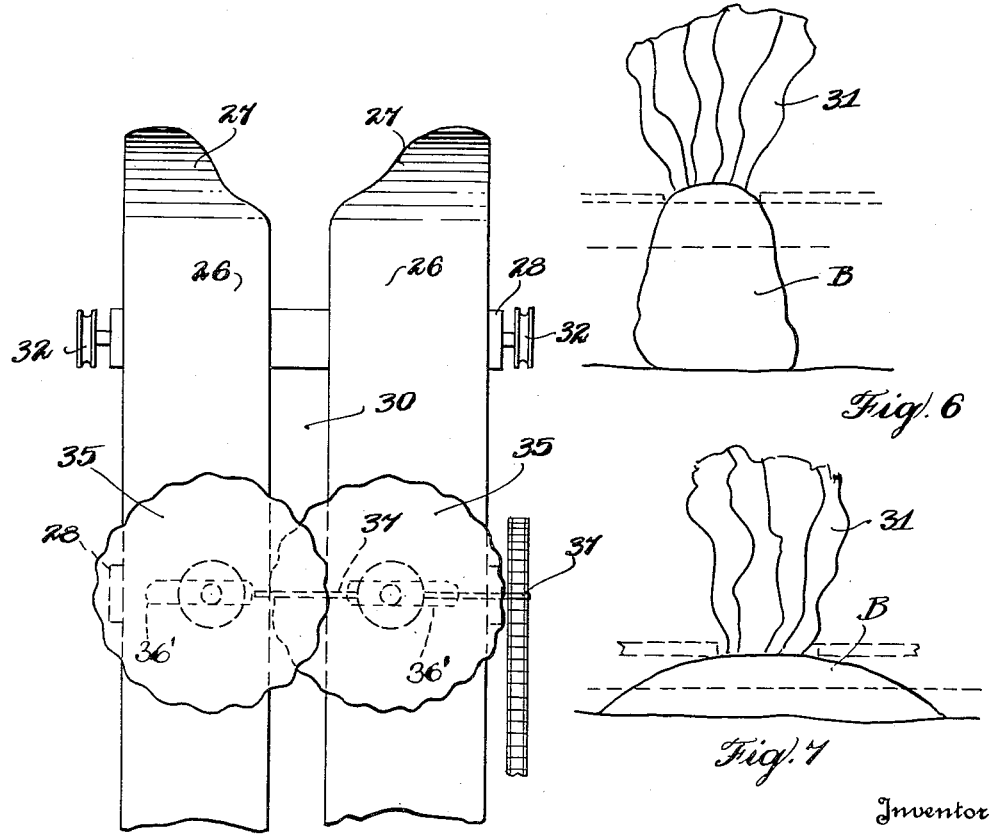
Inventor
George Pierson May 1, 1934.　　　　　G. PIERSON　　　　　1,957,108
BEET HARVESTER
Filed April 18, 1931　　　3 Sheets-Sheet 3
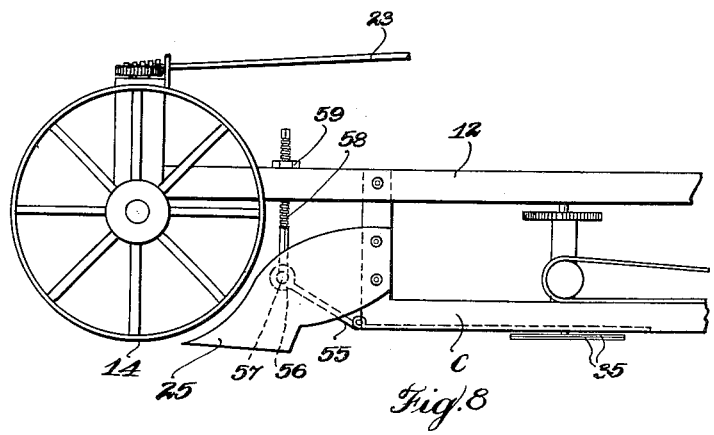
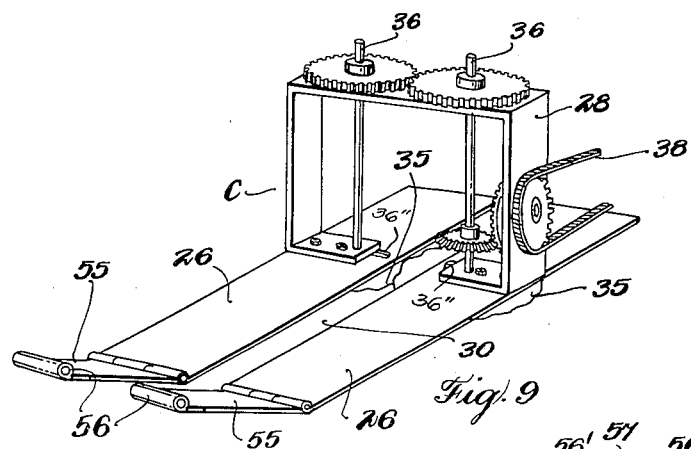
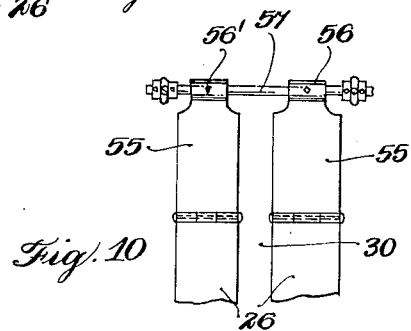
Inventor
George Pierson
By Howard Fischer
Attorney Patented May 1, 1934

1,957,108

UNITED STATES PATENT OFFICE 1,957,108

BEET HARVESTER

George Pierson, Chaska, Minn., assignor of one-half to John A. Diethelm, Victoria, Minn.

Application April 18, 1931, Serial No. 531,036

6 Claims. (Cl. 55—107)

This invention relates to a beet harvester adapted to travel along the row of beets when they are ready to be harvested and having means for topping the same. The topping mechanism is adapted to ride as a cradle on the ground, being free to raise up and down over the uneven ground, guided by the runners and held in the frame of the machine in operative position. This topping cradle carries the cutting knives which cut off the tops of the beets as the cradle is carried over the ground and while the beets are firmly fixed in the ground.

The beet harvester is designed with means for breaking the ground on either side of the row of beets as the harvester travels along at a point right back of the topping mechanism and just in advance of the beet lifting mechanism which is provded and operated in the harvester to automatically lift the beets out of the ground onto a conveyor.

The beet lifting mechanism includes a pair of boring augers having a conical nature so that the enlarged ends of the same are adjacent each other and these augers are rotated toward each other to operate with their points going into the ground just back of the ground breaking hooks or members which are positioned right back of the topping mechanism.

When the earth boring augers lift the beets out of the earth they have a tendency to shake the beets free of the dirt around and about the same and lift the beets up onto the carrier which is of an open nature so as to permit the remainder of the dirt, if any, to be shaken off as the beets are carried up to the upper end of the conveyor. A compartment is provided for receiving the beets at the back of the harvester which is formed with a dumping bottom or end so that when the same is filled with beets they can be dropped out onto the ground, or the conveyor can carry the harvested beets directly into any container or trailer mechanism which will be adapted to receive the beets as they are harvested in the operation of the machine traveling along the row of beets.

The structure of my harvester is of a nature to provide a machine having a light construction, yet being made very durable and with parts which co-operate together to operate in a manner to easily lift the beets out of the ground without injury to the beets and freeing the same of the dirt so that the beets may be more easily handled, thus harvesting the beets in an economical manner with a rapid operation as the harvester travels along the row of matured beets.

These features and details together with other objects will be more fully and clearly described and set forth throughout the specification and claims.

In the drawings forming part of the specification:

Figure 4 is a plan view of the beet harvester.

Figure 5 is a bottom view of the topping cradle, a portion of which is broken away.

Figure 6 illustrates diagrammatically the position of a beet which projects out of the ground an unusual amount.

Figure 7 illustrates diagrammatically the normal position of a beet in relation to the ground line.

Figure 8 is a detail of the forward portion of the beet or vegetable harvester with another form of supporting the topping unit.

Figure 9 is a perspective detail of the topping unit illustrated in Figure 8, removed from the supporting frame.

Figure 10 is a plan view of a detailed portion of the unit illustrated in Figures 8 and 9.

Figure 1:
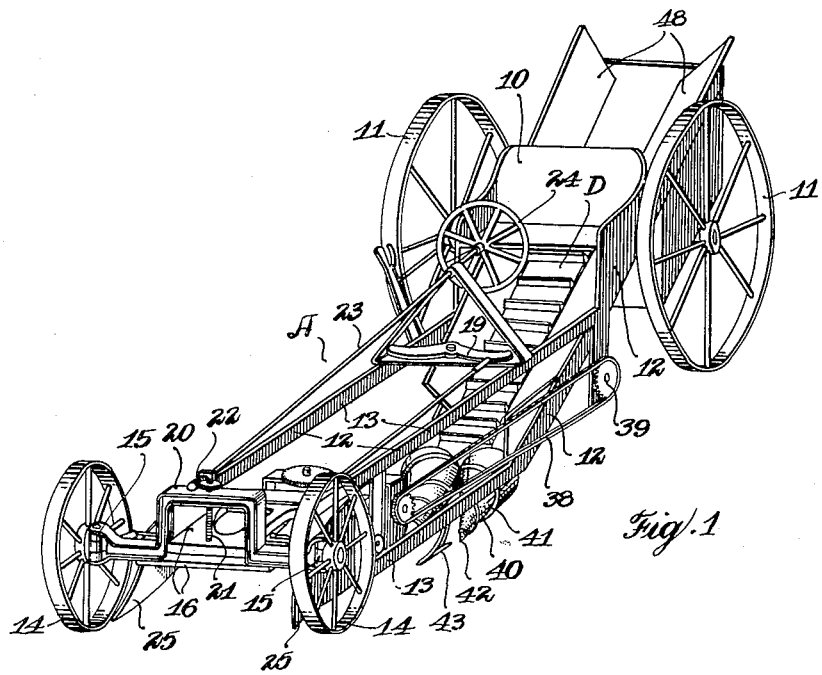
Figure 1 is a perspective front view of the beet harvester.

The beet harvester A is provided with a seat 10 for the operator between the operating rear wheels 11 which carry the frame side members 12 extending between the wheels 11 and with forwardly projecting parallel rails portions 13 which are extensions of the side frames 12.

The front end of the sides 12 which are formed into the parallel rails 13 are adapted to be supported upon the steering wheels 14 which support the steering knuckles 15 and which carry the frame 16 at the front end of the machine. The steering knuckles are operated by the tie rods 17 which hold the steering knuckles 15 in operative position to keep the wheels 14 in proper alinement for operation, while the steering rod 18 extends back to the foot operating member 19 so that the operator on the seat 10 may use his feet for steering the wheels 14 in the operation of the harvester A.

The front frame 16 is made in a manner so as to carry the front end of the side members 12 or the parallelly disposed portions 13 thereof, mounted upon the overhanging yoke 20 which straddles over the frame portion 16 and which is adapted to be raised and lowered by the screw member 21 through the gears 22 and the operating rod 23 which is operated by the hand wheel 24 by the operator on the seat 10. The operation of the hand wheel 24 will raise and lower the front end of the sides 13 or 12 of the harvester A.

Figure 2:
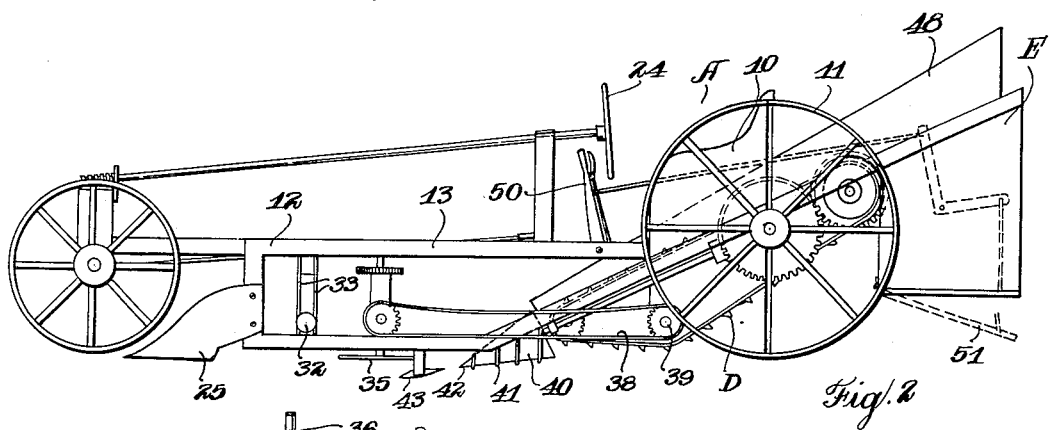
Figure 2 is a side elevation of the same.

The sides 13 or frame portions 12 are provided with guiding shoes 25 projecting forward from the front end of the frame 12, as illustrated in Figures 1 and 2, and also in Figure 4. These guiding shoes 25 are adapted to straddle the rows of beets such as B, illustrated in Figures 6 and 7, and these shoes 25 are bent outwardly to have a tendency of guiding the front end of the machine A over the ground.

Figure 3:
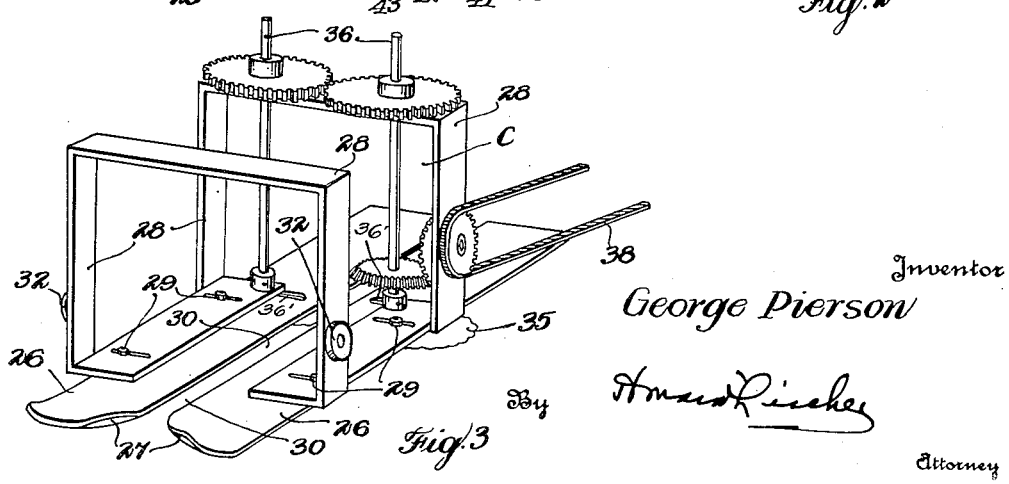
Figure 3 is a perspective front view of the topping cradle removed from the remainder of the machine.

Parallelly disposed members 13 of the sides 12 of the frame of the machine A are adapted to receive the beet topping cradle mechanism C. This mechanism C is illustrated as it would appear removed from the side rails 13 in Figure 3.

The beet topping mechanism C is formed with ground shoes 26 having upwardly curved guiding ends 27. The guide shoes 26 are mounted upon the frame members 28 and held by the bolts 29 adjustable toward or away from each other. By adjusting the shoes 26 a wider or narrower slot 30 is formed between the same. This slot 30 is adapted to be centrally disposed over the top of the beets such as B so that the topping or leaf portion 31 of the beets B is guided between the sides of the shoes 26 and into the slot 30.

The forward end of the mechanism or cradle C is carried by the guide wheels 32 which hold the topping cradle C between the guide members 33. The guides 33 hold the wheels 32 in a manner so that the topping cradle C may operate up and down freely in the movement of the harvester A along over the ground. Thus as the harvester A is adapted to travel along over the ground the guide wheels 14 are operated to guide the shoes 26 on either side of the beets B, with the topping portion 31 projecting in the slot 30. The cradle C will raise freely up and down and guide itself over the inequalities of the ground. If the beet, like B in Figure 6, sticks up very high out of the ground the forward curved ends 27 will guide the shoes 26 upwardly with the edges of the shoes 26 which form the slot 30 resting on top of the beet as the shoes 26 travel up and over along the sides of the same.

The topping cradle C is provided with topping knives 35 which are carried on the lower end of the shaft 36 mounted in the back portion of the frame 28. The shafts 36 pass through slots 36' in the shoes 26. The knives 35 overlap as illustrated more clearly in the bottom view in Figure 5, and the upper knife is provided with blades 37 which rotate around and act to throw the toppings away from the slot 30 in the rapid turning of the blades 35. The blades 35 are operated by the chain drive 38 which extends along the side in the frame 12 back to the shaft 39, the operation of which will be later described.

The harvester A is provided with boring plows 40 which have a conical shape and are formed with a helically projecting rib 41 extending over the surface of the same.

The apexes 42 of the boring plows 40 are adapted to project down into the ground directly in back of the ground breaking shoes or hooks 43. The ground breaking shoes or hooks 43 are adjustably supported on either side of the frame 12 so as to be properly positioned in relation to the apexes 42 of the boring plows 40 to operate to break up the ground and loosen the same directly in front of the plows 40.

The plows are positioned in a manner so that the points 42 engage into the ground on either side of the beets B. The base portions of the plows are adjacent each other and the plows are adapted to be operated by the shafts 44 and the gears 45 which operate with the driving gears 46 carried by the shaft 47 which supports the wheels 11. Thus with the operation of the wheels 11 the gears 46 will operate the gears 45 to drive the shafts 44, thereby driving the boring plows 40 in a manner so as to rotate toward each other and engage the beets B so as to virtually lift the same right out of the ground, causing the beets to oscillate and shake around as they are lifted out of the ground to shake the dirt off of the same, and lifting the beets up onto the carrier D or endless belt which is adapted to carry the beets up between the mold boards 48 and to drop the same into the beet receiving compartment E at the rear end of the machine A. When the compartment E has been filled with beets gathered by the harvester A, by means of the hand lever 50 the operator may dump the bottom 51 of the compartment E to drop the beets out of the same.

In operation the harvester A having a light nature, passes freely along the row of beets such as B with the cradle C traveling over the ground, the front end being regulated as to height by the wheel 24. The harvester A may be pulled by a tractor or other suitable means of drafting the same through the beet field, or it may be equipped with an engine and propelling means so that it can be self-propelled. This self-propelling mechanism is not illustrated in the drawings. The harvester operates with a certain speed to top the beets and then lift them in a manner so as to oscillate the beets sufficiently in lifting them out of the ground to assist in shaking them free of the dirt around and about the same. The beets are then carried by the belt D up to the compartment E or into any other container that may be desired, or they may be dropped off onto the ground.

The shaft 39 is driven by the conveyor belt operating over a suitable sprocket, not illustrated, to propel the shaft 39, so as to drive the cutter blades 35. The blades 35 may be formed with serrated surfaces as illustrated in Figure 5, so that they will freely operate adjacent each other to make a clean cut in removing the top 31 of the beets. The harvester operates smoothly through the field and raises the beets in a manner so as to quickly harvest the same in a very desirable manner.

The topping unit C may be made in the form illustrated in Figures 8, 9 and 10 where the front end of the unit C is formed with hinged plate portions 55 connected to the front ends of the shoes 26 and which are connected by the loops 56 to the transverse shaft 57 extending between the sides of the frame 12. The loops 56 are rigidly secured to the shaft 57 by means of the set screws 56' so that the portions 55 will operate together. In other words, if one shoe 26 moves in a manner to rotate the shaft 57, each of the forward hinge portions 55 will move in unison with the shaft 57. This provides a structure to carry the front end of the unit C equally up and down in travelling over the ground. The frame 28 is connected adjustably to the shoes 26 by bolts passing through a slot 36'' in the shoes. The shafts 36 also pass through this slot.

The shaft 57 is adjustably supported by the rods 58 which are adjusted by the nuts 59 in relation to the frame 12 so as to raise or lower the front end of the unit C in relation to the ground over which the unit C travels. With this structure illustrated in Figures 8 to 10, inclusive, of the unit C, the front brace member 28 is not necessary like in Figures 1, 2 and 3, nor are the guiding rollers 32 necessary to hold the front end of the unit C in operative position. The shoes 26 are of the same character and are adjustably supported to regulate the width of the slot 30 between the two shoes 26. The unit C in Figures 8 to 10, inclusive, carry the same cutting blades 35 which overlap in the slot 30 and act to cut off the tops of the vegetables or beets which are being harvested by the harvester A.

It is apparent that the harvester A may be used for harvesting other vegetables, such as rutabagas, carrots, onions, and other vegetables where the bulb is under the ground and must be raised out of the same. When this harvester A is used for such articles as carrots, or onions, or smaller vegetables, which mature in the ground similar to sugar beets of other beets of a character wherein this machine is adapted to be used, the parts of the same may be designed in accordance with the size of the articles upon which it is to be used so that it will operate very effectively in removing the vegetables out of the ground, harvesting the some in an effective manner so as to accomplish the desired results.

In accordance with the patent statutes I have described the principles of my harvester, and while I have illustrated a particular formation and arrangement of the parts, I desire to have it understood that the same may be varied within the scope of the following claims without departing from the spirit of the invention.

I claim:

1. A vegetable root harvester comprising, a topping unit, ground engaging shoes carried on the bottom of said unit, means for adjusting said shoes to provide an open slot between the same, rotary cutting blades superimposed and overlapping carried by said unit associated with the slot of said shoes in a manner to cut the tops off of vegetable roots as said unit passes over the same, and a frame for slidably supporting said unit in a manner so that the same may raise and lower as it passes over the surface of the ground sliding on said shoes.

2. A beet harvester including, a frame, drive and steering wheels for supporting said frame, a topping unit comprising, a vertically slidable auxiliary frame, vertical guide means on either side of said frame, pivot means on said auxiliary frame operable in said guide means, topping knives on said auxiliary frame, ground and beet engaging shoes on said frame, and means connecting said driving wheels with said topping knives to operate the same.

3. A beet harvester including, a frame, a topping unit within said frame, spaced ground engaging shoes extending above said topping unit, and means for adjusting the spacing apart of said shoes.

4. A topping mechanism including, a frame, a pair of spaced shoes secured to said frame, topping disks extending beneath said shoes, and means for adjusting the space between said shoes to regulate the amount of beet to be topped off.

5. A harvester including, a frame, an auxiliary frame slidably and pivotally connected at opposite sides thereto, rotary cutting disks on said auxiliary frame, ground engaging shoes on said frame, and means for driving said disk to top the vegetables harvested.

6. A beet harvester including, a frame, a pair of vertical guides oppositely disposed on either side of said frame, an auxiliary frame, ground engaging shoes on said auxiliary frame, a pivotal connecting means on said auxiliary frame slidable between said guides, and topping knives supported upon said auxiliary frame.

GEORGE PIERSON.